INVENTOR.
Frederick W. Seybold

March 13, 1956 F. W. SEYBOLD 2,737,828
AUTOMATIC TRANSMISSION
Filed Dec. 23, 1952 4 Sheets-Sheet 3

INVENTOR.
Frederick W. Seybold

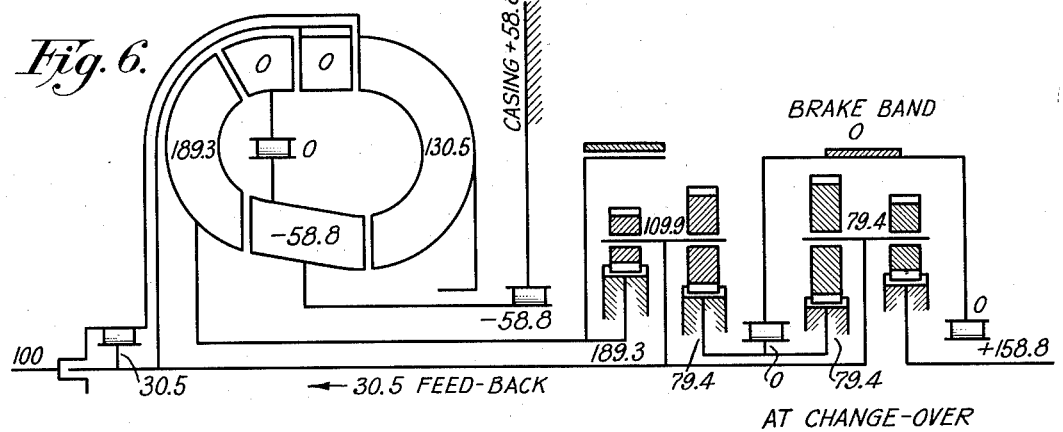
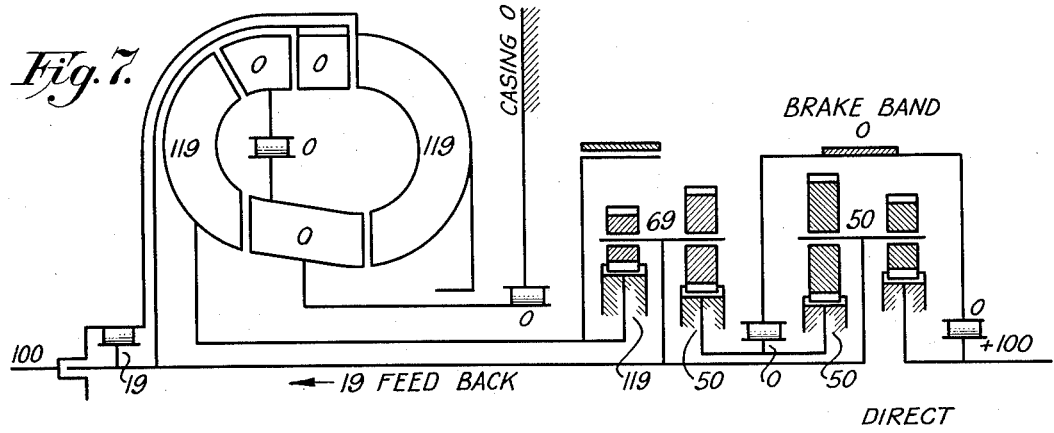
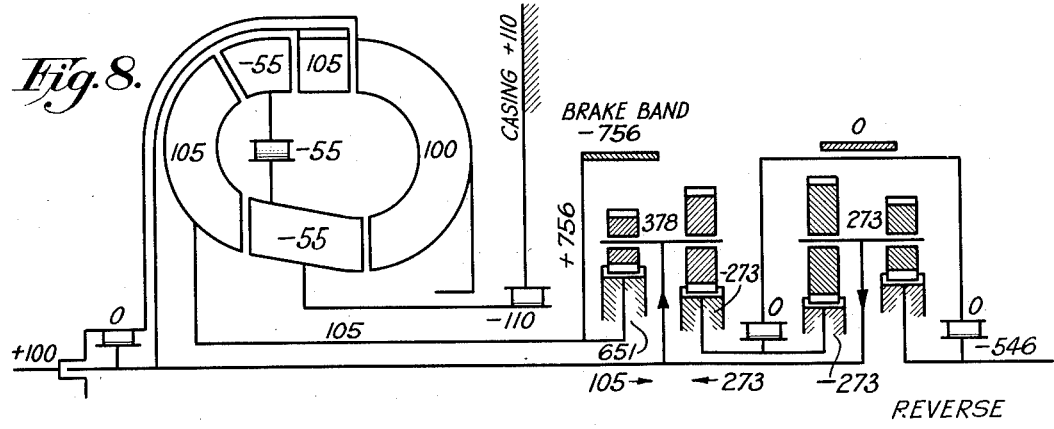

United States Patent Office 2,737,828
Patented Mar. 13, 1956

2,737,828

AUTOMATIC TRANSMISSION

Frederick W. Seybold, Scotch Plains, N. J.

Application December 23, 1952, Serial No. 327,546

20 Claims. (Cl. 74—677)

This invention relates to automatic transmissions particularly to those adapted for use with internal combustion engines or other applications that require variable torque ratios and it is an improvement of my copending application, Serial No. 290,188, filed May 27, 1952.

A primary object of the present invention is to provide an automatic variable speed transmission which is provided with means to make it capable to pass from the low gear ratio and multiplied torque smoothly into direct drive ratio without benefit of auxiliary controls, such as centrifugal devices as a governor, or a solenoid, or by throttle manipulation.

Another object of this invention is to provide a torque and speed controlled transmission which is capable to automatically adapt itself to the required torque ratio.

A further object of this invention is to combine the flexibility of a fluid torque converter having multiple turbines with an arrangement of two planetary gear sets to achieve a relatively high torque multiplication for starting in the forward as well as in the reverse direction.

A still further object of this invention is to provide means whereby the economy of "overdrive" becomes available through the use of the same two planetary gear sets which produce low gear and direct forward drive ratio, as well as the reverse gear ratio.

It is a still further object of this invention to provide this power transmission with a device to prevent the vehicle in which said transmission is installed from rolling backward when the transmission is conditioned for forward operation, but in which said device becomes automatically ineffective when the transmission is conditioned for reverse operation.

This invention includes other features of construction whereby this transmission is made eminently efficient and practical in operation to those devised heretofore.

The above objects and advantages will become apparent when reference is made to the following description taken in connection with the accompanying drawings, in which:

Figure 6 is another similar view showing the torque distribution at the instant when the reaction has become zero and a portion of the applied torque to the planetary gearing is "fed back" to the input member of the transmission;

Figure 7 is still another similar diagrammatic view showing the torque distribution to the components of the transmission when "direct" drive ratio is in effect;

Figure 8 shows in another diagrammatic view how the torques are distributed to the components when the transmission is conditioned for "reverse" operation.

GENERAL ARRANGEMENT

Figure 1:
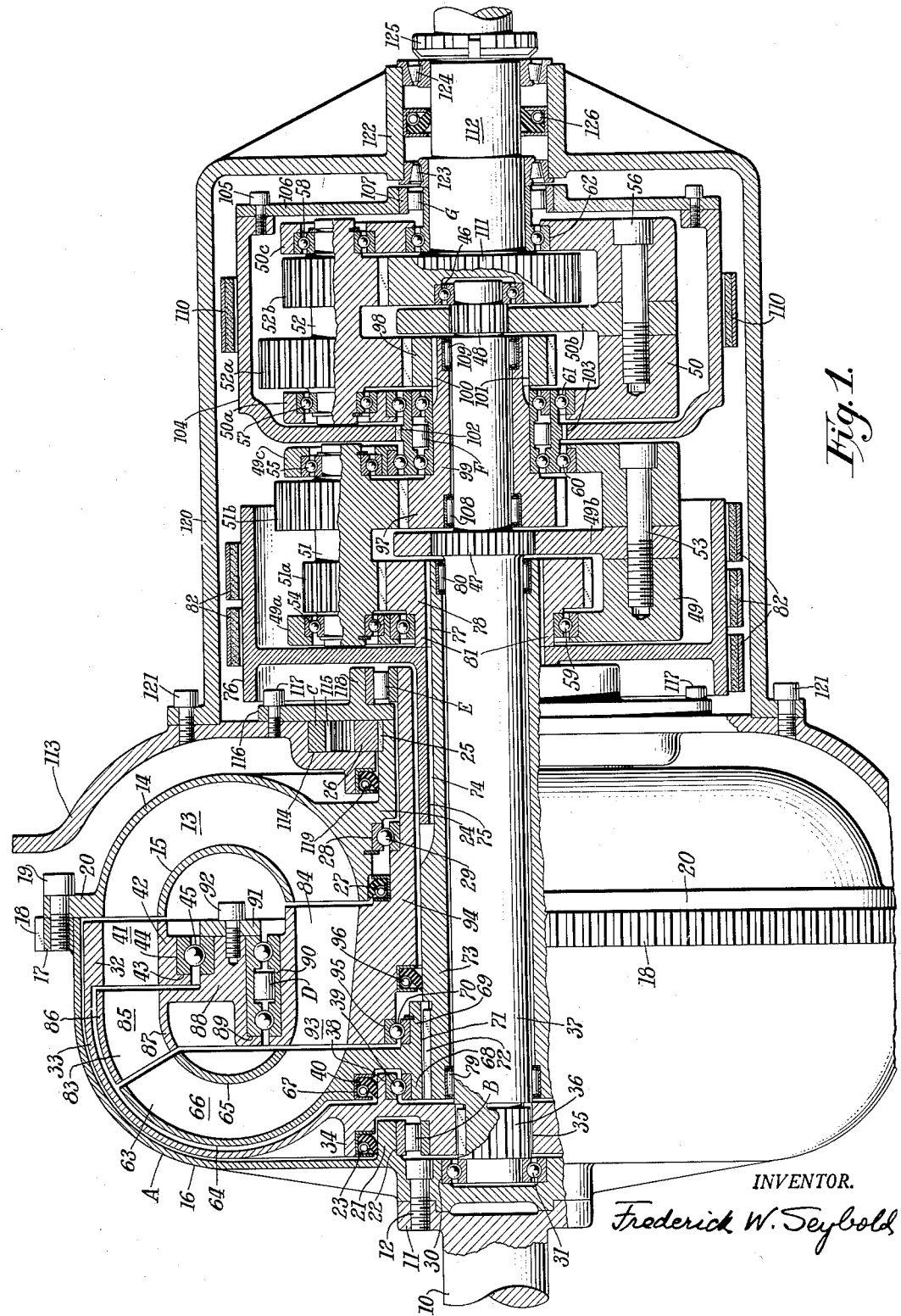
Figure 1 is a vertical, longitudinal section through a power transmission constructed according to my invention.

In general this invention comprises the combination of a multiple turbine fluid torque converter whose blade design produces relatively low torque multiplication at stall and joined with an arrangement of two interconnected planetary gear sets produces a power transmission which is capable of providing ample torque for the rapid acceleration of a motor vehicle from rest and which is capable by its own progressive action to produce a continuously decreasing torque and speed ratio and finally pass into the 1:1 or direct drive ratio, at which time the converter has changed its operation over into a highly efficient fluid coupling.

The converter comprises a pump member driven by the engine whose discharged fluid enters the first turbine member which is connected to the planetary pinion carriers of the two interconnected planetary gear sets.

The first turbine discharges oil into a first stator to redirect the fluid into a second turbine member which is connected to a first sun gear of the first planetary gear set. From this second turbine the fluid is discharged into a second stator element which redirects the oil flow to produce a minimum of shock at its re-entry into the pump.

The first stator is connected to the second stator through an overrunning clutch whereby backward rotation of the first stator relative to the second stator is prevented. The second stator is provided also with an overrunning brake for the transmission of the reaction torque of both stators to the stationary transmission casing.

A sun gear from each of the two planetary gear sets is connected to form a reaction member whose reaction torque is transmitted through an overrunning clutch to a brake drum which is braked by a suitably actuated brake band.

The output member of the transmission is the last of the four co-axial sun gears and with which mesh the planetary pinions that are rotatably mounted on the carriers.

Reverse operation of the transmission is secured by applying a brake band to a brake drum which is integral with the second turbine and the first sun gear and by releasing the brake band from the brake drum of the reaction member.

Upon acceleration of the engine to set the vehicle into motion the speed ratio between the first and second turbine elements is determined by the gear proportions of the first planetary gear set. The speed of the second turbine will be less than that of the first turbine, hence the latter will attain or approximate the speed of the pump first, but an overrun of the input or pump member by the first turbine is prevented by an overrunning clutch mounted between the first turbine and the input member.

A further rise in speed of the engine will bring about the condition where the first turbine has attained the speed of the input or pump member but it cannot exceed it. There is then no longer any backward rotational force felt by the first stator and it is now free to turn with the first turbine. The second turbine speed has also increased proportionately, but its torque ratio has been reduced correspondingly.

From then on all the input power is delivered through the second turbine to the first sun gear whereby a further increase in output torque is obtained by the compound reaction sun gears and the pinion carrier rotation. As the speed of the second turbine relative to the pump increases a condition is produced which compels the reaction member to turn in the same direction as the input member and this is caused by the overrunning clutch between the first turbine and the input or pump member.

The applied torque to the first sun gear is divided in the first planetary gear set between the second sun gear and the planetary pinion carrier of the first gear set. That portion of the torque delivered to the second sun gear is, of course, delivered to the third sun gear, because they are connected to form the reaction member. That portion of the torque that was delivered to the planetary pinion carrier of the first gear set is again divided and a larger portion of this torque is delivered to the planetary pinion carrier of the second gear set because the two carriers are integral. The sum of the torques imposed on the third sun gear and the second carrier equals the torque on the fourth sun gear which is the output element.

The smaller portion of the divided torque of the first planetary pinion carrier is "fed back" to the input shaft to be re-circulated and multiplied in the fluid torque converter. This phase then prevailing in the transmission may be described as the "change-over" or the "transition" point where no torque multiplication is derived from the reaction member of the gear sets, because the reaction member has then left its "anchor" and has begun rotation in the direction of the driving member.

Torque multiplication, however, still continues in the fluid torque converter as long as the second stator remains stationary. A high degree of efficiency is attained in the transmission of power at the transition point where the planetary gearing ceases to function as a torque converter.

The complete absence of "cross-over" shifting of clutches and brakes to bring about the various speed and torque ratios in the transmission is to be noted and this is accomplished smoothly without shock or jerks in the invention now to be fully described.

STRUCTURAL ARRANGEMENT

Figure 2:
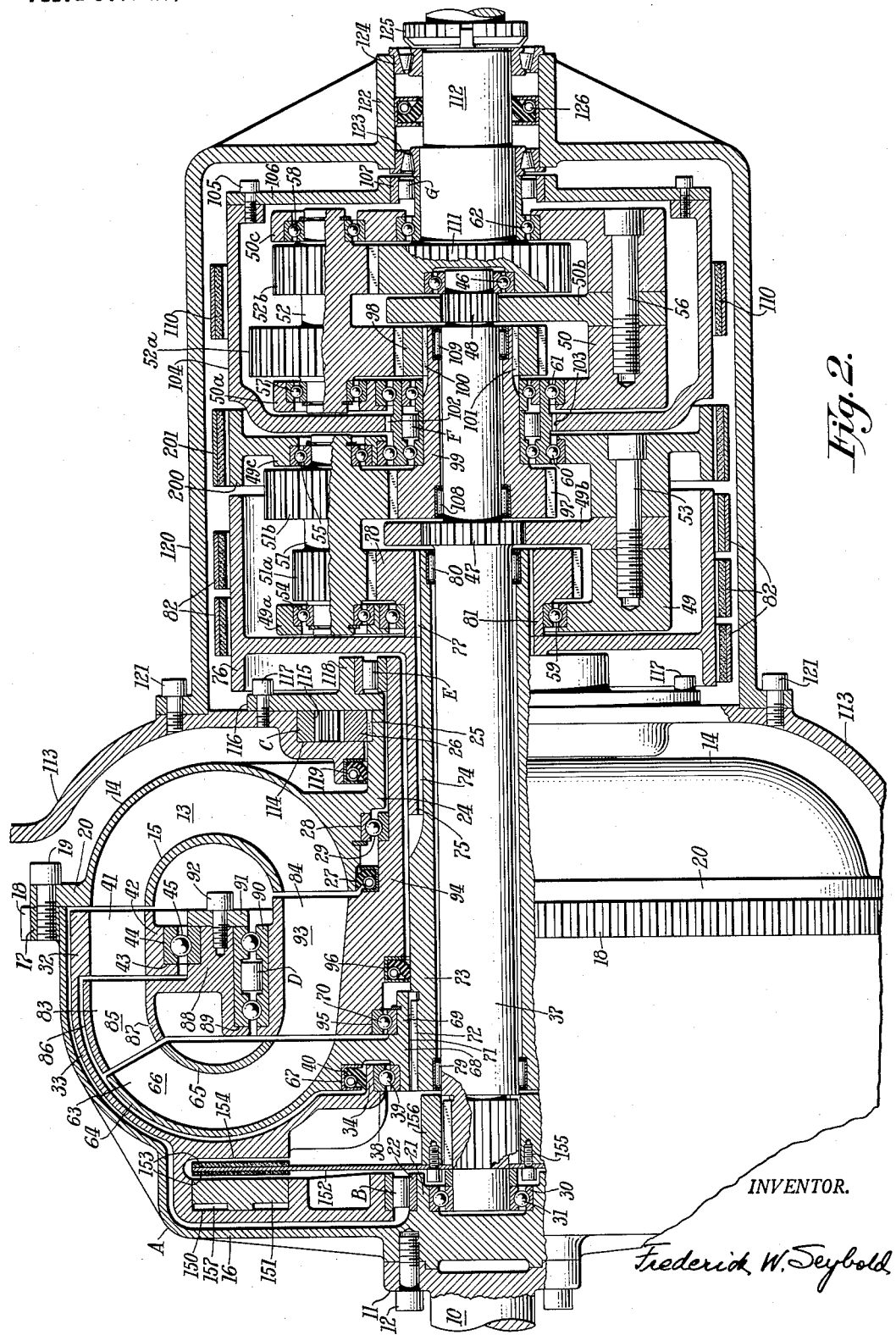
Figure 2 is a vertical, longitudinal section of a power transmission constructed similarly to that shown in Figure 1, but with the additional means to provide the "overdrive" ratio.

The two transmissions illustrated in Figures 1 and 2 may best be understood by dividing each of them into seven assemblies. The construction shown in Figure 2 differs from the construction of Figure 1 in respect to only one of the seven assemblies and that assembly will be described in detail after the seven assemblies of Figure 1 have been completely described.

STRUCTURAL ARRANGEMENT OF FIGURE 1

1. The driving assembly

The driving assembly comprises the drive shaft 10 which is provided with a flange 11 for mounting a hydrokinetic torque converter "A" by means of the screws 12. Curved blades 13 are equally spaced between the outer shell 14 and the inner shell 15 forming the pump or impeller of the torque converter. A shell 16 which is welded to a flange 17, into which teeth 18 for cooperation with the starter pinion are cut, is fastened by means of screws 19 to the flange 20 of the outer shell 14 of the converter.

A hub 21 is provided on the shell 16 to receive at its inner diameter the member 22 of an overrunning clutch "B," and its outer diameter accommodates the oil seal 23. The outer shell 14 is also provided with a hub 24 and splines 25 thereon to which one of the pump gears 26 of a gear pump "C" is connected. On the shell 14 is further provided a smooth surface to accommodate the oil seal 27, as well as a bore 28 for receiving the ball bearing 29.

The shell 16 has a bore 30 for mounting the ball bearing 31.

2. The first turbine assembly

The first turbine assembly consists of the turbine 32 composed of the toroidal shell 33 and the hub 34 to accommodate the oil seal 23 and the inner member of the overrunning clutch "B." The hub 34 is also provided with internal splines 35 which fit over the external splines 36 of the long shaft 37. The hub 34 is further provided with a bore 38 to receive the outer race of ball bearing 39 and its outer diameter is suitable to accommodate the oil seal 40. Curved blading 41 is equally spaced between the outer shell 33 and the inner ring 42 which is provided with a recess 43 and a bore 44 for the reception of the outer race of the ball bearing 45.

The long shaft 37 is supported at one end by the ball bearing 31 and at the other end on the ball bearing 46. The long shaft 37 is further provided with external multiple splines 47 and 48 which mate respectively with suitable internal splines of the two planetary pinion carriers 49 and 50.

These carriers are composed of three sections for reasons of assembly as well as for providing the most favorable and secure mounting for the compound planetary pinions 51 and 52. The three sections 49a, 49b, and 49c are fastened together by the screws 53 and ball bearings 54 and 55 journal the three sets of compound planetary pinions 51 in sections 49a and 49c respectively.

Similarly the three sections 50a, 50b and 50c are fastened together by the screws 56 and ball bearings 57 and 58 journal the compound planetary pinions 52 in sections 50a and 50c respectively. Sections 49a, 49c, 50a and 50c are provided with bores for the reception of the outer races of ball bearings 59, 60, 61 and 62 respectively.

Sections 49b and 50b are provided with internal splines which mate with the external splines 47 and 48 of the shaft 37.

3. The second turbine assembly

The second turbine assembly comprises the turbine 63 composed of the outer toroidal shell 64 and the inner toroidal shell 65. Curved blades 66 are equally spaced between shells 64 and 65. The shell 64 is provided with a bore 67 for supporting the oil seal 40 and a hub 68 for receiving the inner race of ball bearing 39. Another hub 69 accommodates the inner race of the ball bearing 70. The hub 68—69 is provided with internal multiple splines 71 which fit over the external multiple splines 72 of the long sleeve 73, which at the opposite end is also provided with external multiple splines 74. The latter fit into internal multiple splines 75 of the brake drum 76 and into the internal multiple splines 77 of the first sun gear 78, which meshes with the planetary pinions 51a.

Needle bearings 79 and 80 journal the long sleeve 73 on the long shaft 37 and the inner race of ball bearing 59 is supported on the hub 81 of the first sun gear 78. The brake drum 76 serves to arrest the rotation of the entire second turbine assembly when the multiple wrap brake band 82 is applied.

4. The stator assembly

The stator assembly consists of the large diameter stator element 83 and the small diameter stator element 84. The stator element 83 is equipped with suitable blades 85 between its outer and inner toroidal shells 86 and 87 respectively. Inner shell 87 is joined to a hub 88 which has a recessed bore 89 for the reception of the outer member of a combination ball bearing and overrunning clutch "D." The hub 88 is further provided with a suitable support for the ball bearing 45 of the first turbine assembly. A ring 91 fastened by means of screws 92 to the hub 88 holds ball bearing 45 and member "D" in place.

The outer diameter of stator element 84 provides a seat for the inner member 90 of the combination ball bearing and overrunning clutch "D." Curved blades 93 join the outer diameter of the stator element 84 to the long sleeve 94 which at one end is provided with a suitable recess 95 for the reception of the outer race of the ball bearing 70, and suitable recesses for carrying the oil seals 27 and 96. The long sleeve 94 is shouldered about midway for the reception of the inner race of the ball bearing 29 and at the other end it carries the inner member of the overrunning brake "E," which prevents the rotation of the smaller stator assembly in a direction opposite to that of the drive shaft 10, but permits rotation of the smaller stator assembly in the same direction as that of the drive shaft 10. Similarly, overrunning clutch "D" permits the large diameter stator element 83 to rotate in the same direction as that of the drive shaft 10, but any tendency to rotate in the opposite direction is prevented by the clutch "D," which, of course, transmits such rotational tendency to the overrunning brake "E."

5. The reaction assembly

The reaction assembly consists of the second sun gear 97 of the first planetary gear set and the first sun gear 98 of the second planetary gear set. Sun gear 97 meshes with the planetary pinions 51b and the sun gear 98 meshes with the planetary pinions 52a. Sun gear 97 has a sleeve extension 99 which is provided with external multiple splines 100 fitting into internal multiple splines 101 of the sun gear 98, thereby making these sun gears into an integral unit.

Secured to the sleeve extension 99 is the inner member of the combination ball bearing and overrunning clutch "F," while its outer member is journalled respectively in sections 49c and 50a of the first and second planetary pinion carriers. The outer member of clutch "F" is provided with external multiple splines 102 which fit into internal multiple splines 103 of the wide cylindrical brake drum 104. Secured by the screws 105 is the plate 106 which is provided with a bore 107 for the reception of the outer member of a combination ball bearing and overrunning clutch "G."

Needle bearings 108 and 109 journal the reaction member on the long shaft 37. A brake band 110, when applied to the brake drum 104, will arrest the rotation of the sun gears 97 and 98 in the direction of rotation opposite to that of the drive shaft 10, but will not prevent their rotation in the same direction as that of the drive shaft 10, this being accommodated by the overrunning clutch "F."

6. The driven assembly

The driven assembly comprises the second sun gear 111 of the second planetary gear set, and it meshes with the planetary pinions 52b. This sun gear may be made integral with the stepped output shaft 112. The gear 111 is provided with a recess for the reception of the ball bearing 46 which journals one end of the long shaft 37, and the inner member of a combination ball bearing and overrunning clutch "G" is secured on the shaft 112. The outer race of this ball bearing was indicated previously by the reference numeral 62.

The output or driven shaft 112 is journalled on suitable anti-friction bearings supported on the casing assembly now to be described.

7. The casing and gear pump assembly

The casing in which the complete transmission is housed consists of several sections for convenience of assembly. The section 113 conforms to the general shape of the torque converter and it is fastened to the engine frame (not shown).

Section 113 is provided with a recess 114 in which the gear pump "C" composed of internal gear 115 meshing with the previously mentioned pump gear 26 is installed. A pump cover plate 116 is secured to the casing 113 by means of the screws 117 and a hub 118 provides internally a support for the outer member of the overrunning brake "E." This gear pump delivers pressure oil to suitable pistons and cylinders (not shown) controlled by a common valve for the operation of the brake bands 82 and 110, as well as keeping the converter properly filled. These features are well known in the art and need no further description.

An oil seal 119 is also mounted in the casing section 113 to prevent leakage of oil from the gear pump. The cup shaped casing 120 is secured to the casing section 113 by means of the screws 121 and it surrounds the planetary gear assemblies, the brake wheels, brake bands and associated actuating mechanism.

Casing 120 is provided with a hub 122 with a suitable bore for receiving the outer members of tapered roller bearings 123 and 124 in which the output shaft 112 is journalled. A lock nut and washer 125 is provided on shaft 112 for the proper adjustment or wear of the bearings 123 and 124. An oil seal 126 prevents leakage of oil from the casing 120.

Suitable hydraulically actuated pistons operating in stationary cylinders (not shown) are also a part of this assembly, but their function and operation of the brake bands 82 and 110 are well known in the art and need not be described in detail. In addition a piston valve (not shown), manually controlled from the steering wheel, distributes pressure oil to these cylinders to apply the brakes or permits drainage of said oil from the cylinders to release the brakes.

STRUCTURAL ARRANGEMENT OF FIGURE 2

The transmission according to the design shown in Figure 2 differs from that just described only in the construction of the first turbine assembly, whereby an overdrive ratio is obtained. The same reference numerals of the corresponding parts common to both designs are used in Figure 2.

A description of the first turbine assembly need only be given, therefore, for the complete understanding of the transmission shown in Figure 2, as assemblies 1, 3, 4, 5, 6 and 7 are identical in Figure 1 and Figure 2.

2a. The first turbine assembly

The first turbine assembly consists of the turbine 32 composed of the toroidal shell 33 and a hub 34 with a bore 38 to receive the outer race of the ball bearing 39 and its outer diameter is suitable to accommodate the oil seal 40. Curved blading 41 is equally spaced between the outer shell 33 and the inner ring 42 which is provided with a recess 43 and a bore 44 for the reception of the outer race of the ball bearing 45.

The toroidal shell 33 is further provided with a cylindrical cavity 150 for the reception of the "ring" piston 151, and it also carries the outer member of the overrunning clutch "B."

A flexible clutch disc 152 with friction surfaces 153 secured thereon cooperates with the "ring" piston 151 and a flat surface 154 on the shell 33. Clutch disc 152 is fastened by means of srews 155 to a multiple splined hub 156 which fits over the multiple splines 36 of the long shaft 37.

Suitable conduits (not shown) are provided for the passage of pressure oil to the chamber 157 to force "ring" piston 151 against clutch friction surfaces 153 and securely lock them against surface 154.

The long shaft 37 is supported at one end by the ball bearing 31 and at the other end on the ball bearing 46. The long shaft 37 is further provided with external multiple splines 47 and 48 which mate respectively with suitable internal splines of two planetary pinion carries 49 and 50. These carriers are composed of three sections for reasons of assembly as well as for providing the most favorable and secure mounting for the compound planetary pinions 51 and 52.

The three sections 49a, 49b, and 49c are fastened together by the screws 53 and ball bearings 54 and 55 journal the three sets of compound planetary pinions 51 in sections 49a and 49c respectively. Similarly the three sections 50a, 50b, and 50c are fastened together by the screws 56 and ball bearings 57 and 58 journal the compound planetary pinions 52 in sections 50a and 50c respectively. Sections 49a, 49c, 50a and 50c are provided with suitable bores for the reception of the outer races of ball bearings 59, 60, 61 and 62 respectively.

Sections 49b and 50b are provided with internal splines which mate with external splines 47 and 48 of the shaft 37. Section 49c is further provided with a brake drum 200 to cooperate with the brake band 201 for arresting the rotation of a part of the first turbine assembly when brake 201 is applied.

OPERATION

A. *Idling or "neutral" operation*

When the vehicle brakes are applied and the engine is idling and all brake bands of the transmission are in their released condition the driven shaft 112 remains stationary. For the purpose of illustrating the design of a transmission embodying this invention the following gear proportions have been chosen:

FIRST GEAR SET

| | Teeth |
|---|---|
| First sun gear 78 | 51 |
| Planetary pinion 51a | 17 |
| Second sun gear 97 | 39 |
| Planetary pinion 51b | 31 |

SECOND GEAR SET

| | Teeth |
|---|---|
| Third sun gear 98 | 36 |
| Planetary pinion 52a | 36 |
| Fourth sun gear 111 | 48 |
| Planetary pinion 52b | 24 |

For one revolution of the drive shaft 10 or impeller 13—14—15—16 the various assemblies make:

| | Revolutions |
|---|---|
| 1. Driving assembly | +1 |
| 2. First turbine assembly | +1 |
| 3. Second turbine assembly | $+18/31$ |
| 4. Stator assembly | 0 |
| 5. Reaction assembly | −1 |
| 6. Driven assembly | 0 |

B. *Forward drive*

Figure 4:
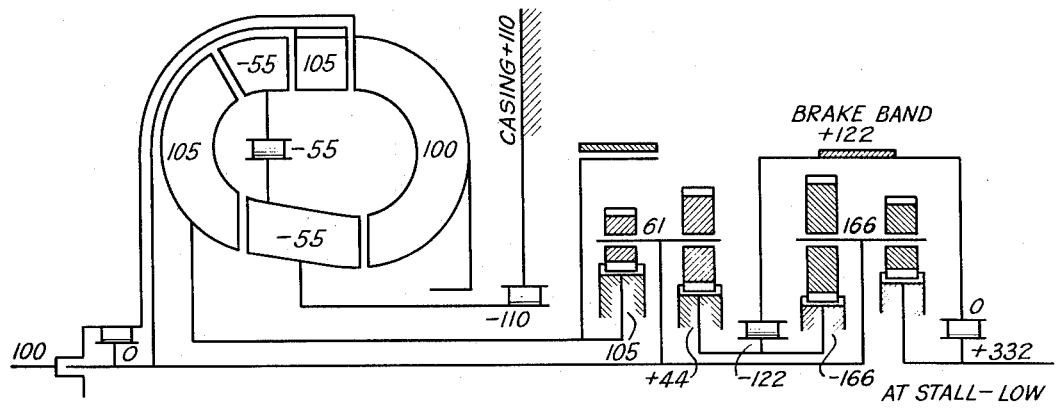
Figure 4 is a diagrammatic view of the transmission showing the torque distribution to its components in terms of 100 units of input torque at stall.

With the foot brake applied the transmission control lever on the steering post is shifted from the "neutral" position into the "drive" position and as a result the brake band 110 is applied to the brake drum 104 and thereby the rotation of the reaction sun gears 97 and 98, and the first and second turbine assemblies will cease. Upon release of the foot brake and an acceleration of the engine its torque will be multiplied by the action of the fluid in the converter and by the sun gear reaction members 97 and 98. Assuming that the torque converter is so designed that both turbines deliver an equal share of the multiplied torque produced by the converter at stall, the various torques are distributed to the components of the transmission as shown in Figure 4.

The maximum torque multiplication at stall is only about 2.1 times engine torque for this type of converter in order to give a high coupling efficiency to the converter. The torque values shown in Figure 4 are based on 100 units of engine torque and 332 units of torque will then be applied to the driven shaft 112 at the beginning of motion of the vehicle.

The speed ratio between the first and second turbine assemblies is determined by the gear proportions of the first planetary gear set and with the tooth data as stated before, then for one revolution of the first turbine assembly the second turbine assembly will make $18/31$ or .58065 revolution.

The speed of both turbines continues to rise with a further increase in engine speed, but the speed ratio between the turbines is maintained until the speed of the first turbine equals the engine or impeller speed, whereupon all of the multiplied torque is delivered by the second turbine alone to the first sun gear 78. There the speed ratio of second turbine to impeller is .58065 and according to Figure 3 the torque multiplication ratio is about 1.45.

If the engine torque is represented by 100 units the torque delivered by the second turbine will be 145 units. This torque will be further increased by the reaction sun gears 97 and 98 to produce 168 units of torque on the output shaft 112, which now rotates at one-half the speed of the input shaft 10.

Figure 5:
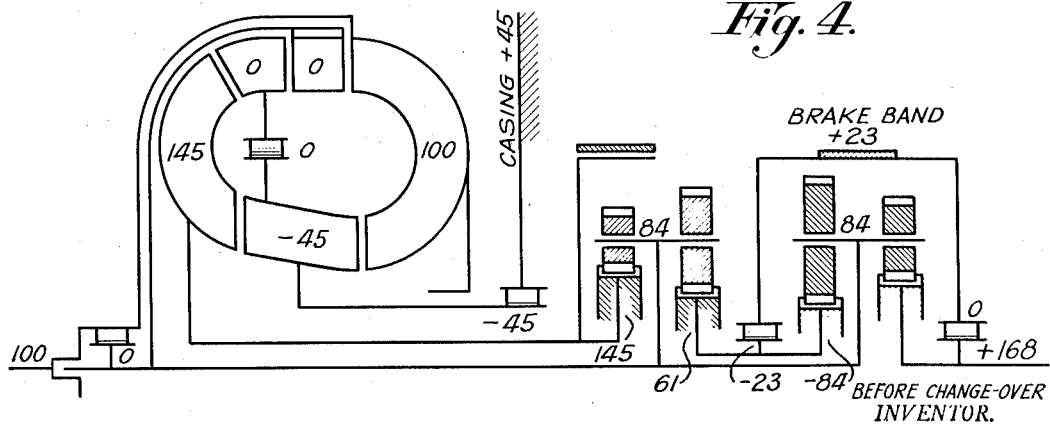
Figure 5 is a similar diagrammatic view showing the torque distribution at the instant when the first turbine has attained the speed of the impeller.

The efficiency of the transmission (neglecting friction losses) is therefore, $$\frac{168 \times .5}{100} = .84 \text{ or } 84\%$$

and the torque distribution is shown in Figure 5.

Now as the speed ratio of the second turbine assembly exceeds .58 and because the first turbine assembly cannot "overrun" the drive shaft 10, being prevented by the overrunning clutch "B," the reaction sun gears 97 and 98 cease to function as torque multiplying gears and they begin to rotate in the direction of the drive shaft 10.

The torque applied on the first sun gear 78 is divided in the first planetary gear set between the second sun gear 97 and the carrier 49, the pinions 51a and 51b acting as a lever thereon. That portion of the torque impressed on the sun gear 97 is delivered to the sun gear 98 because they are integral, while the portion of the torque impressed on the first carrier 49 is again divided and a larger portion of this torque is delivered to the second carrier 50, the pinions 52a and 52b also acting as a lever. The sum of the torques imposed on the third sun gear 98 and the second carrier 50 produces the torque impressed on the fourth sun gear 111 of the output shaft 112.

Figure 3:
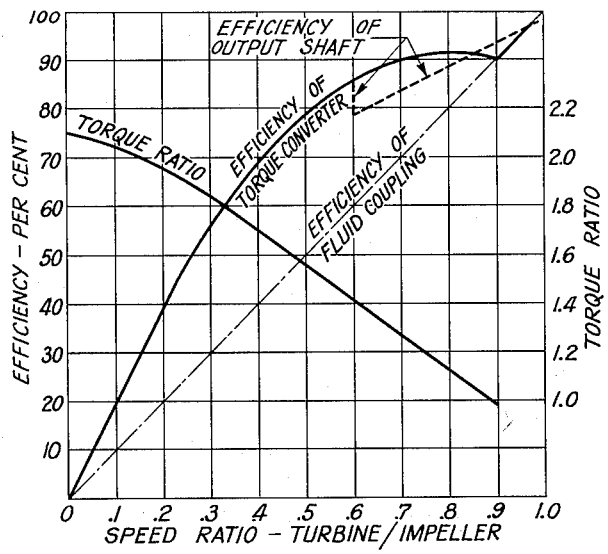
Figure 3 is a graph showing the torque ratio of the fluid torque converter in relation to the speed ratio of turbine to impeller and the corresponding efficiency of the converter and the efficiency of the output shaft.

The remainder or smaller portion of the torque impressed on the first carrier 49 which was not passed on to carrier 50 is "fed back" through the shaft 37 to the overrunning clutch "B" to the impeller 13—14—15—16, and it augments the input torque from the engine to be again multiplied in proportion to the then prevailing torque multiplication ratio according to Figure 3.

The amount of this "feed-back" torque is 16.13% of the applied torque on the first sun gear 78 for the gear data as stated. If the torque on first sun gear 78 is represented by T and the torque multiplication ratio at this transition point is 1.45, then $$T = 1.45(100 - .1613T)$$
$$= 145 - .234T$$
$$= \frac{145}{.766}$$
$$= 189.3 \text{ units of torque}$$

Figure 6 shows the distribution of torque at the instant when the reaction sun gears 97 and 98 begin to rotate in the direction of the drive shaft 10.

Sun gear 78 with its 189.3 units (or 116%) of torque delivers 109.9 (or 58%) units to carrier 49 and 79.4 units (or 42%) of the input torque to the reaction gears 97 and 98. An equal amount or 79.4 units of torque is delivered to the carrier 50, leaving 30.5 units or 16% to be "fed back" to the impeller for re-circulation and multiplication.

The efficiency of the transmission (neglecting friction losses) is, therefore, $$\frac{158.8 \times .5}{100} = .794 \text{ or } 79.4\%$$

The efficiency of the converter, however, is $$\frac{189.3 \times .58}{100} = .84 \text{ or } 84\%$$

at the point of transition where the planetary gear sets cease to function as torque converters. A drop of about 4.6% in efficiency occurs at this transition point.

The second turbine assembly continues to increase in speed relative to the impeller and finally the second turbine will attain a speed ratio of .90, where the torque converter will begin to function as an efficient fluid coupling, the fluid in the converter now impinges on the back of the blades 93 of the stator 84, to compel their rotation in the direction of the drive shaft 10.

Figure 7 shows the torque distribution prevailing in the converter and transmission when the torque multiplication ratio is unity. If the torque on the first sun gear 78 is again represented by T, then $$T = 1.00(100 - .1613T)$$
$$= \frac{100}{.8487}$$
$$= 119 \text{ units of torque}$$

Sun gear 78 receives 119 units of torque from the second turbine 63 and 69 units of torque are passed on to the first carrier 49, and 50 units of torque are received by the reaction sun gears 97 and 98.

The 69 units of torque of the first carrier 49 are divided so that 50 units are delivered to the second carrier 50 and 19 units of torque are "fed back" through the shaft 37 and overrunning clutch "B" to the drive shaft 10 where it combines with 100 units of engine torque to drive impeller 13—14—15—16 to deliver 119 units to the second turbine 63.

The 50 units of torque each delivered to sun gear 98 and carrier 50 are combined through the planetary pinions 52 to deliver 100 units of torque to the output shaft sun gear 111 and hence to shaft 112.

Assuming that in "direct" drive a speed ratio of turbine 63 to impeller 13—14—15—16 of .98 is attained or 2% slip prevails, then for one revolution of the drive shaft 10 the various assemblies make:

|   | Revolutions |
|---|---|
| 1. Driving assembly | 1 |
| 2. First turbine assembly | 1 |
| 3. Second turbine assembly | .980 |
| 4. Stator assembly | .960 |
| 5. Reaction assembly | .9523 |
| 6. Driven assembly | .9762 |

The efficiency of the transmission in "direct" drive with 2% slip in the converter is, therefore, 97.67%. A sudden or gradual increase in torque demand will be automatically accommodated by the converter and the reaction sun gears without intervention of control devices, the brake band 110 remaining applied as long as the control valve is set for forward operation and the overrunning clutch "F" permits the rotation of the reaction sun gears 97 and 98 in the direction of the drive shaft 10, however it prevents their backward rotation to produce torque multiplication when required. Similarly the overrunning clutch "D" and brake "E" prevent backward rotation of the stator elements, but permit their forward rotation when the fluid flow direction is favorable for such rotation.

It is also to be noted that the "feed-back" torques at transition as well as in "direct" drive have been reduced by at least 50% from those prevailing in the design of my co-pending application, Serial No. 290,188.

C. *Overdrive operation*

To take advantage of the fuel saving which can be had through the use of an "overdrive" ratio as shown in the construction of Figure 2, the control lever is shifted into the "overdrive" position. The clutch assembly 151—152—153 must be in its engaged condition for accelerating and for "direct ratio" driving of the vehicle and for "overdrive" operation of the vehicle the clutch becomes released when the oil pressure on ring piston 151 is relieved and the oil behind "ring" position 151 is permitted to drain from the chamber 157. At the same time the brake 201 is applied to the brake drum 200 of the carrier 49—50, thereby bringing it to a halt.

The first turbine, of course, continues to rotate, but it cannot overrun the drive shaft 10 because overrunning clutch "B" prevents this possibility. For one revolution of the drive shaft 10 the various components of the transmission make:

|   | Revolutions |
|---|---|
| 1. Driving assembly | 1 |
| 2. First turbine assembly | 1 |
| 3. Second turbine assembly | .980 |
| 4. Stator assembly | .960 |
| 5. Carrier 49—50 | 0 |
| 6. Reaction assembly | 2.337 |
| 7. Driven assembly | 1.1685 |

In other words, for one engine revolution the output shaft makes 1.1923 revolutions or when the engine is driving the car in "direct" at 50 miles per hour, the car would have a speed of about 60 miles per hour with the same engine speed when the "overdrive" ratio is used. With the arrangement shown in Figure 2 no extra gear set is required to obtain an "overdrive" ratio, nor is it necessary to release the brake band 110.

In order to return the transmission to "direct" drive, brake band 201 is released from the drum 200 and clutch assembly 151—152—153 is re-engaged. In the "overdrive" ratio the output shaft 112 will receive only 84 units of torque from the 100 units of engine input torque, the other 16 units of torque are absorbed by the brake 201.

D. *Reverse operation*

For reverse operation of the transmission the multiple-wrap brake band 82 is applied to the brake drum 76, while the brake band 110 is released from the drum 104. The entire second turbine assembly with the first sun gear 78 will now be stationary and the first turbine assembly alone delivers 105 units of torque to the long shaft 37 and carriers 49—50.

For one revolution of the carrier 49—50 the various assemblies make:

|   | Revolutions |
|---|---|
| 1. Driving assembly | 1 |
| 2. First turbine assembly | 1 |
| 3. Second turbine assembly | 0 |
| 4. Stator assembly | 0 |
| 5. Reaction assembly | −1.3846 |
| 6. Driven assembly | −.1923 |

The output torque is, therefore, $$\frac{105 \times 1}{-.1923} = -546 \text{ units of torque}$$

and as the torque on carrier 50 and the reaction 98 is equal to one-half of the output torque, then:

|   | Units |
|---|---|
| Torque of reaction gears 97—98 | −273 |
| Torque of carrier 50 | 273 |
| Torque of shaft 37 | 105 |
| Torque of carrier 49 | 378 |
| Torque of sun gear 78 | 651 |
| Torque of second turbine assembly | 105 |
| Torque of brake drum | 756 |

The above torque relationship prevailing from the transmission is conditioned for reverse operation is shown in Figure 8.

E. *No-roll-back*

As long as the brake band 110 is applied the overrunning clutch "G" prevents the vehicle from rolling backward when it comes to a halt on an incline without the use of the foot brake. This feature is a great convenience for again setting the car into motion without dexterous manipulation of the emergency brake and the accelerator. When the transmission is in "neutral" or is set for "reverse" operation the reaction sun gears 97 and 93 rotate in a direction opposite to that of the drive shaft 10 faster than the output shaft 112, therefore, the "no-roll-back" device "G" becomes automatically ineffective.

Both designs have now been described in detail and it will be obvious that various modifications, rearrangements and minor improvements will suggest themselves to those skilled in the art. For example, the band brakes could readily be replaced by positive brakes or a combination of friction and positive brakes.

It should further be understood that the gear proportions illustrated may be varied greatly to accommodate various operating conditions and such modifications shall come within the scope of the following claims.

I claim:

1. A variable speed transmission comprising in combination, a drive shaft, a driven shaft, a multiple element hydraulic torque converter having a pump element, two turbine elements and two stator elements, said pump element being connected to the drive shaft, a first turbine element of said converter being connected to a first and a second planetary pinion carrier, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, brake means connected to said second and third sun gears, stationary brake band means cooperating with said brake means, to cause the driven shaft to rotate in the same direction as the drive shaft but at reduced speed and increased torque when said stationary brake band means is applied to said brake means.

2. A variable speed transmission comprising in combination, a drive shaft, a driven shaft, a multiple element hydraulic torque converter having a pump element, two turbine elements and two stator elements, said pump element being connected to the drive shaft, a first turbine element of said converter being connected to a first and a second planetary pinion carrier, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, overrunning clutch means on said second and third sun gears, brake means in cooperating relation with said overrunning clutch means, stationary brake band means cooperating with said brake means, to cause the driven shaft to rotate in the same direction as the drive shaft, but at reduced speed and increased torque when said stationary brake band means is applied to said brake means.

3. A variable speed transmission comprising in combination, a drive shaft, a driven shaft, a multiple element hydraulic torque converter having a pump element, two turbine elements and two stator elements, one-way clutch means between said stator elements to permit rotation in the forward direction of one of the stator elements relative to the other stator element, said pump element being connected to the drive shaft, a first turbine element of said converter being connected to a first and a second planetary pinion carrier, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, overrunning clutch means on said second and third sun gears, brake means in cooperating relation with said overrunning clutch means, stationary brake band means cooperating with said brake means, to cause the driven shaft to rotate in the same direction as the drive shaft, but at reduced speed and increased torque when said stationary brake band means is applied to said brake means.

4. A variable speed transmission comprising in combination, a drive shaft, a driven shaft, a multiple element hydraulic torque converter having a pump element, two turbine elements and two stator elements, one-way clutch means between said stator elements to permit rotation of the first stator element relative to the second stator element in the forward direction only, one-way brake means to prevent the rotation of the second stator element in a direction opposite to that of the drive shaft, but permitting both stator elements to rotate in the same direction as the drive shaft, said pump element being connected to the drive shaft, a first turbine element of said converter being connected to a first and a second planetary pinion carrier, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, overrunning clutch means on said second and third sun gears, brake means in cooperating relation with said overrunning clutch means, stationary brake band means cooperating with said brake means, to cause the driven shaft to rotate in the same direction as the drive shaft, but at reduced speed and increased torque when said stationary brake band means is applied to said brake means.

5. A variable speed transmission comprising in combination, a drive shaft, a driven shaft, a multiple element hydraulic torque converter having a pump element, two turbine elements and two stator elements, said pump element being connected to the drive shaft, a first turbine element of said converter being connected to a first and a second planetary pinion carrier, overrunning clutch means operatively connected to said carriers and in cooperating relation with said drive shaft, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, overrunning clutch means on said second and third sun gears, brake means in cooperating relation with said overrunning clutch means, stationary brake band means cooperating with said brake means, to drive the driven shaft at reduced speed and increased torque when the speed of said turbines is considerably less than the speed of the drive shaft and to cause the speed of the driven shaft to rise and its torque to decrease with an increase in speed of said turbines relative to the pump speed, and finally to cause the speed and torque of the driven shaft to approach that of the drive shaft when the turbine speeds approximate the speed of said drive shaft.

6. A variable speed transmission comprising in combination, a drive shaft, a driven shaft, a multiple element hydraulic torque converter having a pump element, two turbine elements and two stator elements, one-way clutch means between said stator elements to permit rotation in the forward direction of one of the stator elements relative to the other stator element, said pump element being connected to the drive shaft, a first turbine element of said converter being connected to a first and a second planetary pinion carrier, overrunning clutch means operatively connected to said carriers and in cooperating relation with said drive shaft, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, overrunning clutch means on said second and third sun gears, brake means in cooperating relation with said overrunning clutch means, stationary brake band means cooperating with said brake means, to drive the driven shaft at reduced speed and increased torque when the speed of said turbines is considerably less than the speed of the drive shaft and to cause the speed of the driven shaft to rise and its torque to decrease with an increase in speed of said turbines relative to the pump speed, and finally to cause the speed and torque of the driven shaft to approach that of the drive shaft when the turbine speeds approximate the speed of said drive shaft.

7. A variable speed transmission comprising in combination, a drive shaft, a driven shaft, a multiple element hydraulic torque converter having a pump element, two turbine elements and two stator elements, one-way clutch means between said stator element to permit rotation in the forward direction of the first stator element relative to the second stator element, one-way brake means to prevent the rotation of said second stator element in a direction opposite to that of the drive shaft, but permitting both stator elements to rotate in the same direction as the drive shaft, said pump element being connected to the drive shaft, a first turbine element of said converter being connected to a first and a second planetary pinion carrier, overrunning clutch means operatively connected to said carriers and in cooperating relation with said drive shaft, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, overrunning clutch means on said second and third sun gears, brake means in cooperating relation with said overrunning clutch means, stationary brake band means cooperating with said brake means, to drive the driven shaft at reduced speed and increased torque when the speed of said turbines is considerably less than the speed of the drive shaft and to cause the speed of the driven shaft to rise and its torque to decrease with an increase in speed of said turbines relative to the pump speed, and finally to cause the speed and torque of the driven shaft to approach that of the drive shaft when the turbine speeds approximate the speed of said drive shaft.

8. In a variable speed transmission comprising in combination, a drive shaft, a driven shaft, a multiple element hydraulic torque converter having a pump element, two turbine elements and two stator elements, said pump element being connected to the drive shaft, a first turbine element of said converter being connected to a first and a second planetary pinion carrier, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, brake means connected to said first sun gear, stationary brake band means cooperating with said brake means, to cause the driven shaft to rotate in a direction opposite to that of the drive shaft, but at reduced speed and increased torque when said stationary brake band means is applied to said brake means.

9. In a variable speed transmission comprising in combination, a drive shaft, a driven shaft, a multiple element hydraulic torque converter having a pump element, two turbine elements and two stator elements, one-way clutch means between said stator elements to permit rotation in the forward direction of one of the stator elements relative to the other stator element, said pump element being connected to the drive shaft, a first turbine element of said converter being connected to a first and a second planetary pinion carrier, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, brake means connected to said second turbine and said first sun gear, stationary brake band means cooperating with said brake means, to cause the driven shaft to rotate in a direction opposite to that of the drive shaft, but at reduced speed and increased torque when said stationary brake band means is applied to said brake means.

10. A variable speed transmission comprising in combination, a drive shaft, a driven shaft, a multiple element hydraulic torque converter having a pump element, two turbine elements and two stator elements, one-way clutch means between said stator elements to permit rotation in the forward direction of the first stator element relative to the second stator element, one-way brake means to prevent the rotation of said second stator element in a direction opposite to that of the drive shaft, but permitting both stators to rotate in the same direction as the drive shaft, said pump element being connected to the drive shaft, a first turbine element of said converted being connected to a first and a second planetary pinion carrier, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, brake means connected to said second turbine and said first sun gear, stationary brake band means cooperating with said brake means, to cause the driven shaft to rotate in a direction opposite to that of the drive shaft, but at reduced speed and increased torque when said stationary brake band means is applied to said brake means.

11. A variable speed transmission comprising in combination, a drive shaft, a driven shaft, a multiple element hydraulic torque converter having a pump element, two turbine element and two stator elements, said pump element being connected to the drive shaft, a first turbine element of said converter being connected to a first and a second planetary pinion carrier, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, brake means connected to said second and third sun gears, stationary brake band means cooperating with said brake means, overrunning clutch means between said brake means and said driven shaft, to prevent said driven shaft from rotating in a direction opposite to that of the drive shaft when said stationary brake band means is applied to said brake means.

12. A variable speed transmission comprising in combination, a drive shaft, a driven shaft, a multiple element hydraulic torque converter having a pump element, two turbine elements and two stator elements, one-way clutch means between said stator elements to permit rotation of the first stator element relative to the second stator element in the forward direction only, one-way brake means to prevent the rotation of the second stator element in a direction opposite to that of the drive shaft, but permitting both stator elements to rotate in the same direction as the drive shaft, said pump element being connected to the drive shaft, a first turbine element of said converter being connected to a first and a second planetary pinion carrier, overrunning clutch means operatively connected to said carriers in cooperating relation with said drive shaft, a second turbine element being connected to a first sun gear, a second sun gear being connected to a third sun gear, a fourth sun gear being connected to said driven shaft, compound planetary pinions on said first carrier and meshing with said first and second sun gears, compound planetary pinions on said second carrier and meshing with said third and fourth sun gears, overrunning clutch means on said second and third sun gears, brake means in cooperating with said brake means, stationary brake band means cooperating with said brake means, a second brake means connected to said first sun gear, a second stationary brake band cooperating with said second brake means, overrunning clutch means between said first brake means and said driven shaft, to cause the driven shaft to turn in the forward direction when the first stationary brake band means is applied to said brake means, and to turn in the reverse direction when said second stationary brake band means is applied to said second brake means.

13. In a continuously variable speed and torque transmission comprising in combination, a drive shaft, a driven shaft, a multi-turbine-stator torque converter interconnected with two planetary gear sets positioned between said drive shaft and said driven shaft, the first gear set comprising an input sun gear, an output planetary pinion carrier and a reaction sun gear, compound planetary pinions on said output carrier and meshing with said input sun gear and said reaction sun gear, the second gear set comprising an input planetary pinion carrier, an output sun gear and a reaction sun gear, compound planetary pinions on said input carrier and meshing with said output sun gear and said reaction sun gear, the pump element of said torque converter being connected to said drive shaft, a first turbine element being connected to the output planetary pinion carrier of the first gear set and to the input planetary pinion carrier of the second gear set, a second turbine element being connected to the input sun gear of the first gear set, the reaction sun gear of one gear set being connected to the reaction sun gear of the second gear set, the output sun gear of the second gear set being connected to said driven shaft, a first overrunning clutch means on said reaction sun gears, a first brake means in cooperating relation with said first overrunning clutch means, a first stationary brake band means cooperating with said first brake means, a second brake means connected to the input sun gear of the first gear set, a second stationary brake band means cooperating with said second brake means, a second overrunning clutch means between said drive shaft and said first turbine element, an overrunning brake means to permit rotation of said stators in the direction of said drive shaft, whereby, when said first stationary brake band means halts said first brake means, input torque from said drive shaft is amplified in said converter and its divided torque is applied to the input members of said planetary gear sets, wherein additional torque amplification is produced and transmitted to said driven shaft, and whereby a portion of said amplified torque is returned to said drive shaft through said second overrunning clutch means to effect a one-to-one direct drive ratio.

14. In a continuously variable speed and torque transmission comprising in combination, a drive shaft, a driven shaft, a multiple element hydraulic torque converter having a pump element, two turbine elements and two stator elements, one-way clutch and one-way brake means to permit rotation of said stator elements in the direction of the drive shaft, said pump element being connected to the drive shaft, a first turbine element of said converter being provided with a first overrunning clutch means in cooperating relation with said drive shaft, a second turbine element being connected to a first sun gear, a second sun gear being connected to a third sun gear, a fourth sun gear being connected to said driven shaft, a first planetary pinion carrier operatively connected to a second planetary pinion carrier, compound planetary pinions on said first carrier meshing with said first and second sun gears, compound planetary pinions on said second carrier meshing with said third and fourth sun gears, clutch means operatively connected to said carriers, clutch means and clutch coupling means on said first turbine element to couple said carriers thereto, a first brake means connected to said carriers, a first stationary brake band means cooperating with said first brake means, a second overrunning clutch means on said second and third sun gears, a second brake means in cooperating relation with said second overrunning clutch means, a second stationary brake band means cooperating with said second brake means, whereby, with the second stationary brake band means applied to said second brake means and the clutch means on said carriers coupled to said first turbine, the driven shaft will receive multiplied torque when the speed of said turbines is considerably less than the speed of said drive shaft, and when the speed difference becomes negligible, a one-to-one drive ratio will be established, and when the clutch means of the carriers is released and said first stationary brake band means is applied to said first brake means the driven shaft will operate in an overdrive ratio without releasing said second stationary brake band means.

15. In a continuously variable speed and torque transmission comprising in combination, a drive shaft, a driven shaft, a multiple element hydraulic torque converter having a pump element, two turbine elements and two stator elements, one-way clutch and one way brake means to permit rotation of said stator elements in the direction of the drive shaft only, said pump element being connected to the drive shaft, a first turbine element of said converter being provided with a first overrunning clutch means in cooperating relation with said drive shaft, a second turbine element being connected to a first sun gear, a second sun gear being connected to a third sun gear, a fourth sun gear being connected to said driven shaft, a first planetary pinion carrier operatively connected to a second planetary pinion carrier, compound planetary pinions on said first carrier meshing with said first and second sun gears, compound planetary pinions on said second carrier meshing with said third and fourth sun gears, clutch means operatively connected to said carriers, clutch means and clutch coupling means on said first turbine element to couple said carriers thereto, a first brake means connected to said carriers, a first stationary brake band means cooperating with said first brake means, a second overrunning clutch means on said second and third sun gears, a second brake means in cooperating relation with said second overrunning clutch means, a second stationary brake band means cooperating with said second brake means, a third brake means connected to said first sun gear, a third stationary brake band means cooperating with said third brake means, whereby said driven shaft will operate in an underdrive ratio when said second stationary brake band means is applied to said second brake means and the clutch means of said carriers is coupled to said first turbine element and a considerable difference in speed between said pump and said first and second turbine elements prevails; and whereby said driven shaft will operate in an approximate direct drive ratio when a negligible difference in speed between said pump and said first and second turbine elements prevails, and whereby said driven shaft will operate in an overdrive ratio when the clutch means on said carriers is released from said first turbine element and said first stationary brake band means is applied to said first brake means without first releasing said second stationary brake band means; and whereby said driven shaft will operate in a reverse drive ratio when said third stationary brake band means is applied to said third brake means and the clutch means of said carriers is coupled to said first turbine element and said first and second stationary brake band means are released.

16. In a continuously variable speed and torque transmission comprising in combination, a drive shaft, a driven shaft, a multiple element hydraulic torque converter having a pump element, two turbine elements and two stator elements, one-way clutch and one-way brake means to permit rotation of said stator elements in the direction of the drive shaft, said pump element being connected to the drive shaft, a first turbine element of said converter being provided with a first overrunning clutch means in cooperating relation with said drive shaft, a second turbine element being connected to a first sun gear, a second sun gear being connected to a third sun gear, a fourth sun gear being connected to said driven shaft, a first planetary pinion carrier operatively connected to a second planetary pinion carrier, compound planetary pinions on said first carrier meshing with said first and second sun gears, compound planetary pinions on said second carrier meshing with said third and fourth sun gears, clutch means operatively connected to said carriers, clutch means and clutch coupling means on said first turbine element to couple said carriers thereto, a first brake means connected to said carriers, a first stationary brake band means cooperating with said first brake means, a second overrunning clutch means on said second and third sun gears, a second brake means in cooperating relation with said second overrunning clutch means, a second stationary brake band means cooperating with said second brake means, a third overrunning clutch means on said second brake means in cooperating relation with said driven shaft, whereby rotation of said driven shaft in a direction opposite to that of the drive shaft is prevented when said second stationary brake band is applied to said second brake means, and when the clutch means on said carriers is coupled to said first turbine, the driven shaft will receive multiplied torque provided that the speed of said turbines is considerably less than the speed of said drive shaft, and when the speed difference becomes negligible, a one-to-one drive ratio will be established, and when the clutch means of the carriers is released from said first turbine element and said first stationary brake band means is applied to said first brake means the driven shaft will operate in an overdrive ratio without first releasing said second stationary brake band means from said second brake means.

17. In a variable speed mechanism adapted to deliver uninterrupted torque from an input shaft to a coaxial output shaft, comprising in combination a multi-turbine-stator hydraulic torque converter interconnected with two planetary gear sets positioned between said input shaft and said output shaft, the first gear set comprising an input sun gear, an output planetary pinion carrier and a reaction sun gear, compound planetary pinions on said output carrier and meshing with said input sun gear and said reaction sun gear, the second gear set comprising an input planetary pinion carrier, an output sun gear and a reaction sun gear, compound planetary pinions on said input carrier and meshing with said output sun gear and said reaction sun gear, said reaction sun gears being operatively joined, the pump element of said converter being connected to said input shaft, a first turbine element being connected to the output planetary pinion carrier of the first planetary gear set and the input planetary pinion carrier of the second planetary gear set, a second turbine element being connected to the input sun gear of the first planetary gear set, said output shaft being connected to the output sun gear of the second planetary gear set, one of the stators being positioned between the first and second turbines and the other stator being positioned between the second turbine and said pump, one-way clutch and one-way brake means to permit said stators to turn in the same direction as the input shaft, but prevent their rotation in the opposite direction, means to feed back torque from the output planetary pinion carrier of the first planetary gear set to said input shaft, brake means, one-way clutch means in cooperating relation with said brake means and said reaction sun gears to permit rotation of said reaction sun gears relative to said brake means in one direction only, stationary brake band means for halting said brake means, whereby said output shaft will receive uninterrupted torque, the amount of said torque depending on the speed ratio prevailing between said turbines and said pump.

18. In a variable speed mechanism adapted to deliver uninterrupted torque from an input shaft to a coaxial output shaft, comprising in combination a multi-turbine-stator hydraulic torque converter interconnected with two planetary gear sets positioned between said input shaft and said output shaft, the first gear set comprising an input sun gear, an output planetary pinion carrier and a reaction sun gear, compound planetary pinions on said output carrier and meshing with said input sun gear and said reaction sun gear, the second gear set comprising an input planetary pinion carrier, an output sun gear and a reaction sun gear, compound planetary pinions on said input carrier and meshing with said output sun gear and said reaction sun gear, said reaction members being operatively connected, the pump element of said converter being connected to said input shaft, a first turbine element being connected to the output member of the first planetary gear set and the input member of the second planetary gear set, a second turbine element being connected to the input member of the first planetary gear set, said output shaft being connected to the output member of the second planetary gear set, one of the stators being positioned between the first and second turbines and the other stator being positioned between the second turbine and said pump, overrunning clutch and overrunning brake means to permit said stators to turn in the same direction as the input shaft, but prevent their rotation in the opposite direction, overrunning clutch means between the input shaft and the output planetary pinion carrier of the first planetary gear set to feed back to the input shaft a portion of the torque imposed on the output planetary pinion carrier of said first planetary gear set, brake means, overrunning clutch means in cooperating relation with said brake means and said reaction sun gear to permit rotation of said reaction sun gears relative to said brake means in one direction only, stationary brake band means for halting said brake means, whereby said output shaft will receive uninterrupted torque, the amount of said torque depending on the speed ratio prevailing between said turbines and said pump.

19. In a variable speed mechanism adapted to deliver uninterrupted torque from an input shaft to a coaxial output shaft, comprising in combination a multi-turbine-stator hydraulic torque converter interconnected with two planetary gear sets positioned between said input shaft and said output shaft, the first gear set comprising an input sun gear, an output planetary pinion carrier and a reaction sun gear, compound planetary pinions on said output carrier and meshing with said input sun gear and said reaction sun gear, the second gear set comprising an input planetary pinion carrier, an output sun gear and a reaction sun gear, compound planetary pinions on said input carrier and meshing with said output sun gear and said reaction sun gear, said reaction members being operatively connected, the pump element of said converter being connected to said input shaft, a first turbine element being connected to the output member of the first planetary gear set and the input member of the second planetary gear set, a second turbine element being connected to the input member of the first planetary gear set, said output shaft being connected to the output member of the second planetary gear set, one of the stators being positioned between the first and second turbines and the other stator being positioned between the second turbine and said pump, overrunning clutch and overrunning brake means to permit said stators to turn in the same direction as the input shaft, but prevent their rotation in the opposite direction, overrunning clutch means between the input shaft and the output planetary pinion carrier of the first planetary gear set to feed back to the input shaft a portion of the torque transmitted to the output planetary pinion carrier of said first planetary gear set, a first brake means, overrunning clutch means in cooperating relation with said first brake means and said reaction sun gears to permit rotation of said reaction sun gears relative to said first brake means in one directed only, first stationary brake band means for halting said first movable brake means, a second brake means connected to the input member of the first planetary gear set, a second stationary brake band means for halting said second brake means, whereby, when said first stationary brake band means halts said first brake means, the output shaft will turn in the same direction as the input shaft and the amount of the output shaft torque and said fed-back torque will depend on the speed ratio prevailing between said turbines and said pump, and whereby, when said second stationary brake band means halts said second brake means, the output shaft will turn in a direction opposite to that of the input shaft at reduced speed but increased torque.

20. A transmission comprising coaxial input and output shafts and torque multiplying means interposed between said shafts including a hydro-kinetic torque converter composed of a bladed pump, first and second turbines and stators, and interconnected planetary gearing comprising two planetary gear sets, each set having a planetary pinion carrier and two sun gears, compound planetary pinions on said carriers and meshing with their respective sun gears, a sun gear of one gear set being operatively connected to a sun gear of the other gear set, said carriers being joined and operatively connected to said first turbine, said second turbine being connected to another of said sun gears and said output shaft being connected to one other of said sun gears, means to brake said interconnected sun gears to multiply torque in said gear sets, means on said input shaft and carriers for feeding back a portion of said multiplied torque from said carriers to said input shaft and therby further multiply said fed-back torque in said hydro-kinetic torque converter, whereby the reaction torque imposed on said interconnected sun gears is overcome and thereby cause the transmission to operate in an approximately one-to-one ratio when said stators cease their torque multiplying function.

References Cited in the file of this patent

UNITED STATES PATENTS

| | | |
|---|---|---|
| 2,203,177 | Patterson | June 4, 1940 |
| 2,293,767 | Salerni | Aug. 25, 1942 |
| 2,312,849 | Pollard | Mar. 2, 1943 |
| 2,316,390 | Biermann | Apr. 13, 1943 |
| 2,383,980 | Lysholm | Sept. 4, 1945 |

FOREIGN PATENTS

| | | |
|---|---|---|
| 276,405 | Great Britain | Aug. 29, 1927 |